April 6, 1965   B. GLYNN   3,176,337
WINDSHIELD CLEANERS
Filed June 13, 1963
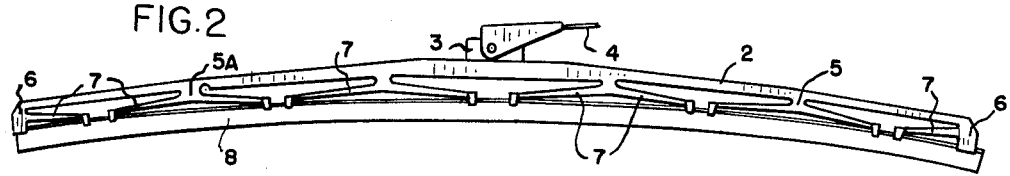
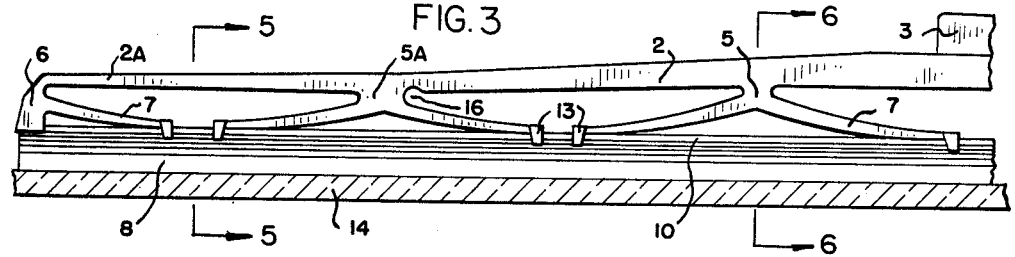
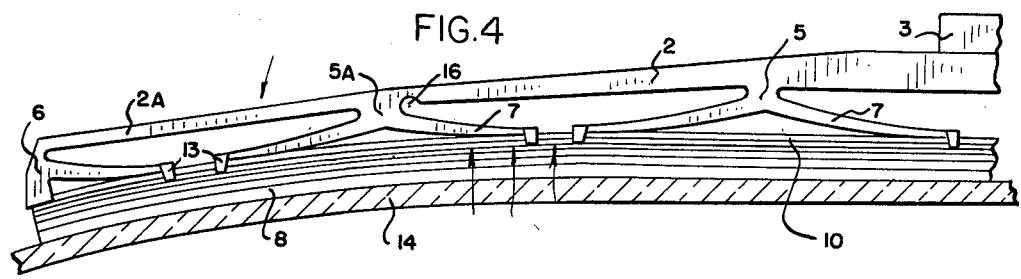
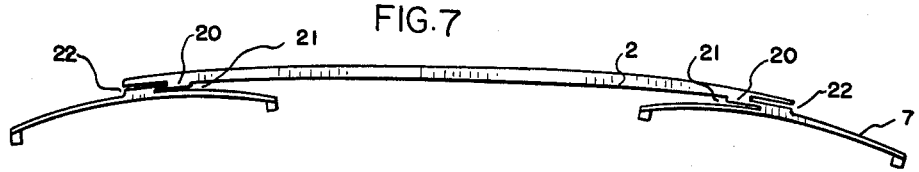
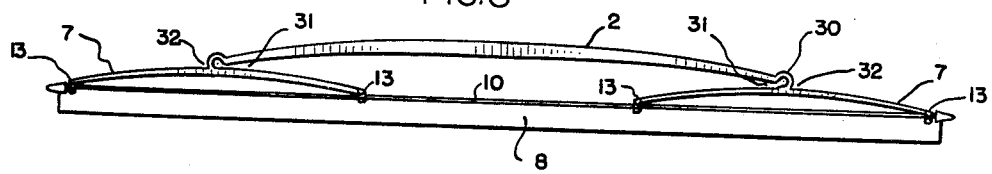
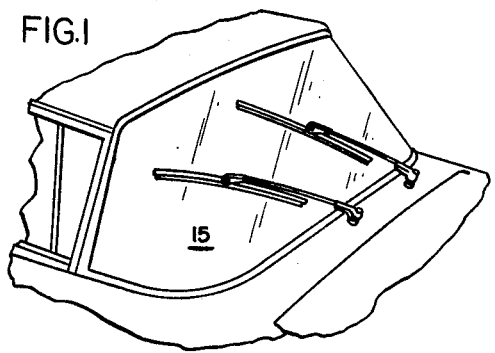
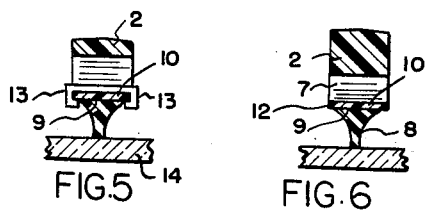
INVENTOR.
BRIAN GLYNN
BY Cullen, Floraan & Cantor
ATTORNEYS.

United States Patent Office 3,176,337
Patented Apr. 6, 1965

3,176,337
WINDSHIELD CLEANERS
Brian Glynn, Dundas, Ontario, Canada, assignor to Tridon Manufacturing Limited, Hamilton, Ontario, Canada
Filed June 13, 1963, Ser. No. 287,573
9 Claims. (Cl. 15—250.42)

This application is a continuation in part of my prior application in the United States, Serial No. 173,065, of February 13, 1962, now abandoned, illustrating embodiments not specifically disclosed in but contemplated to be within the purview of said application.

My invention relates to improvements in automobile windshield cleaners and is particularly directed to wiper blade assemblies for cleaning curved windshields.

One object of the invention is to provide a non-metallic light weight windshield wiper blade assembly having complete flexible resilience along its length enabling the squeegee or blade element of the wiper assembly to conform entirely to changing camber gradients as the blade assembly swings to-and-fro across a curved windshield surface.

The attainment of such desired objective of the invention is procured in the provision of an arrangement wherein the squeegee element of the assembly is supported in slideable self adjusting engagement upon the outer ends of a plurality of leaf spring blade supports or holders integral with and extending from the convex face of a bowed leaf spring backing member formed of molded plastic material such as thermoplastic nylon resin which retains desired resilience and flexing characteristics under a wide range of temperatures, there being integral flexible connectors flexibly connecting the backing member to the blade supports.

A further object of the invention is to provide a plurality of integral flexible connectors upon the concave face of the backing member and from the sides of which the blade supports extend to partly lie along and press against the back of the squeegee element under spring pressure load of the wiper blade assembly against a windshield surface; the connectors connect the backing member to the blade supports.

Another and important object of the invention is to provide in such connectors indents reducing them in cross section whereby said connectors are capable of added deflection to help conform the assembly to the acute curvature of a corner area of a windshield.

With the foregoing and other objects in view, as shall appear, the invention consists of a windshield wiper blade assembly formed and arranged all as hereinafter more particularly described and illustrated in the accompanying drawing, in which:

FIG. 1 is a perspective view of an automobile windshield and illustrating my windshield wiper traversing the acutely curved corner portion of the windshield.

FIG. 2 is a side view of the wiper assembly before being pressed against a windshield under the urge of its supporting arm.

FIG. 3 is an enlarged view of the upper end portion of the wiper assembly in engagement with the relatively flat transverse face of a windshield.

FIG. 4 is a similar view of the wiper assembly to that shown in FIG. 3 and showing the upper end portion of the blade following the curvature of the corner portion of a windshield.

FIG. 5 is a cross-sectional view taken through the line 5—5, FIG. 3.

FIG. 6 is a cross-sectional view taken through the line 6—6, FIG. 3.

FIGS. 7 and 8 show modified forms of backing members.

The windshield cleaner assembly comprises a resilient molded plastic leaf spring backing member 2 arranged for attachment to a usual windshield wiper arm and formed with a plurality of integral resilient molded plastic leaf spring blade supports 7 protruding from and extending lengthwise of the backing member. Flexible connectors 5–6 connect the backing member to the blade supports.

The assembly also includes a blade or squeegee wiping element 8 slidably flexible throughout its length and supported upon the free ends of the blade supports.

The molded plastic backing member 2 comprises a bowed resilient leaf spring of two dimensional cross sectional form and tapering in thickness from its central portion to its ends and preferably formed on its convex face with an integral lug 3 at its central portion and to which the usual spring urged windshield wiper arm 4 is attached, the arm pressing the backing member towards the windshield 14, the latter having (FIG. 1) acutely cambered portions 15.

The plastic connectors 5–6 integrally protrude from backing member 2 in equidistant spaced apart relationship along its concave face.

These connectors 5–6 carry the tapering integral resilient plastic bowed leaf spring blade supports 7.

The squeegee wiping element consists of the usual type of wiper blade 8 formed of rubber-like material and having a flat face 9 to which is attached, as by cement, a pliant plastic strip 10 which extends the length of the blade 8 and is of greater width than the width of the blade face 9, so that its two edges 12 protrude beyond the sides of the blade.

The free end of each support 7 is integrally formed with a pair of jaws 13 which freely embrace the edges 12 of the strip 10, the jaws 13 sliding relative to the strip as the backing member 2 and the supports 7 flex in adjusting to changing camber of the windshield in to-and-fro movements of the wiper.

In manufacture, the backing member, connectors, and blade supports are integrally molded. Part 2 is molded in bow form, as illustrated in FIG. 2.

When the windshield wiper is pressed against a windshield 14 under the urge of the windshield wiper arm 4, against the inherent resilience of the backing member 2, supports 7 assume a configuration, as shown, for example, in FIGS. 3 or 4, wherein the backing member 2 is straightened or partly straightened against the resilience and the supports 7 are deflected against their resilience to cause their free end portions to lie along and press against the squeegee wiping element, whereby the combined deflections of the backing member 2 and free end portions of the supports 7 exert a uniform pressure of the squeegee element along its length against either flat or curved portions of the windshield.

The acute camber of portions 15 of certain types of windshields necessitate considerable inward pressure of the upper tip portion of a wiper blade assembly in cleaning across the curve. To meet this situation, I form the backing member 2 with a cross section reducing indent 16 adjacent to the connector 5A, which connector may be slightly wider and stiffer than the other connectors, and also make the tip portion 2A of the backing member 2 of increased taper and thus thinner and more flexible.

When the wiper blade assembly tip portion swings across a curved windshield corner portion, as depicted in FIG. 4, the reaction pressure of the windshield against the portion of the blade assembly between the connector 5A and adjacent connector 5, as indicated by the arrows, causes the higher resilient tension in such portion of the blade assembly to bend the lesser tensioned thin tip portion of the blade assembly in deflection about the indent and fulcrum provided by the comparatively rigid connector 5A, whereby such tip portion closely hugs the curved corner portion of the windshield in moving thereover, as indicated by the curved arrow.

FIG. 7 shows the connectors 20 between the backing member 2 and the blade supports 7 formed of an ogee shape whose indents 21–22 increase the flexing capacity of the supports relative to the backing member at such connectors.

FIG. 8, for the same purpose, shows the connectors 30 formed of bowed form, with indents at 31–32.

It will be observed that each connector, whether it be of loop or indent form, or of straight form, as at 5, FIG. 4, has two spaced points of flexing; first, where it joins the backing 2, second where it joins the support 7. Thus, danger of the connector breaking under flexing is minimized.

While looped or indented connectors, as at 30, FIG. 8, or 5A–16, FIG. 4, are preferred, the connectors may be straight, as at 5, FIG. 4, just so long as they are long enough to provide some distance between the connector—backing juncture and the connector—support juncture, a distance which spaces these two junctures and permits flexing at both separate junctures.

From the foregoing description it will be apparent that a unique windshield wiping means is provided wherein the integral plastic backing member 2 and blade supports 7 resiliently deflect under pressure of the windshield wiper supporting arm, and under which pressure the free end portions of supports 7 lie along and press against the back of the wiper blade with resultant uniform pressure of the blade against a curved windshield.

Although preferred embodiments of the invention have been disclosed, it is to be understood that I do not limit myself to the exact arrangement of parts herein shown and described, and that modification of the invention may be made without departing from the scope of the invention as defined in the appended claims.

I claim:

1. A windshield cleaner for cleaning a curved surface and comprising;
   a squeegee element flexible throughout its length and conformable to a surface being wiped;
   a bowed resilient plastic leaf spring backing member tapering in thickness from its central portion to its ends and having a convex face and a concave face;
   a plurality of plastic connectors integrally protruding from the concave face of the backing member in spaced apart relationship along its concave face;
   a plurality of resilient leaf spring plastic blade supports integral with and extending from the ends of the connectors in directions lengthwise of the backing member and upon the free ends of which blade supports the squeegee element is slidably supported;
   the free end portions of the blade supports flexing under urge of the backing member towards a surface being wiped to lie along and press against the squeegee element;
   said backing member being formed with an indent intermediately of its length to reduce the backing member in cross sectional area at the indent;
   one portion of the backing member extending from the indent to the end of the backing member being reduced in thickness for increase in flexibility for the purpose specified.

2. A windshield cleaner as defined in claim 1, wherein the indent is located adjacently to a connector.

3. A windshield cleaner as defined in claim 1, wherein the squeegee element comprises a wiper blade formed of rubber-like material and a pliant plastic strip of greater width than the width of the blade and attached to the blade to extend lengthwise thereof, the strip being so positioned in relation to the blade that its two edge portions protrude beyond the sides of the blade, and pairs of jaws formed upon the free ends of the blade supports and freely embracing the two edge portions of the strip.

4. A windshield cleaner for cleaning a curved surface and comprising a squeegee element flexible throughout its length and conformable to a surface being wiped;
   a bowed resilient plastic leaf spring backing member having a concave face and a convex face;
   and a windshield cleaner arm attaching part intermediately of the length of its convex face;
   the leaf spring backing member tapering in thickness from its central portion to its ends;
   a plurality of spaced apart plastic connectors integrally protruding from the concave face of the backing member;
   a plurality of plastic leaf spring blade supports integrally extending outwardly from and lengthwise of the concave face of the backing member and secured by the integral connectors to the backing member concave face, upon the free ends of which blade supports the squeegee element is slidably mounted;
   the backing member and the blade supports resiliently flexing under urge of the windshield cleaner arm towards a surface being wiped; one of the connectors being formed with an indent reducing its cross-sectional area for increase in flexibility.

5. A windshield cleaner for wiping a curved windshield surface, comprising an elongated squeegee element, flexible throughout its length and conformable to the surface being wiped, and mounting means for supporting and resiliently urging said squeegee element towards and into contact with said surface;
   the mounting means being formed as a single, unitary, resilient one-piece part made of a plastic material and formed into an integral backing member portion, a plurality of integral blade support portions and a plurality of integral connector portions;
   said backing member portion being formed as an elongated bowed springy strip having a concave face and a convex face and having a windshield cleaner arm attaching means formed on its convex face;
   said blade support portions each being formed as an elongated, bowed springy strip of considerably less length than said backing member portion and being arranged adjacent to but spaced a short distance from the concave face of said backing member portion, and means formed on each of said blade support portions for slidably engaging and supporting said squeegee element;
   said connector portions being spaced apart along the length of and being integral with and protruding from the concave face of said backing member portion and each connector portion also being integral with one blade support portion and located intermediate the ends thereof;
   the connector portions each being resiliently flexible and of sufficient length to have two separate spaced flexing points, one at the junction with the backing member portion and the other, remote from the first, at the juncture with its respective blade support portion;
   with the backing member portion, the blade support portions and the connector portions and the squeegee element carried by the blade support portions all being substantially coplanar, whereby all said portions independently and jointly resiliently flex under pressure applied by a windshield cleaner arm, secured to said attaching means, towards and away from the surface being wiped for conforming the squeegee element and the mounting means to the curve of said surface and thereby providing a pressurized engagement between the full length of the squeegee element and said surface.

6. In a windshield wiper;
   a longitudinally extending backing member;
   a plurality of longitudinally extending blade holders alongside the backing member and integral therewith;
   each blade holder being connected to the backing member by an integral looped resilient connector extending longitudinally and integral with the backing member and the blade holder;
one end of each looped connector being connected to a point of the backing member and the other end of each looped connector being connected to a point of the respective blade holders.

7. A device as claimed in claim 6, wherein one end of each looped connector is connected to a respective end point of the backing member and the other end of each loop connector is connected to the respective blade holder at its mid-point.

8. In a windshield wiper; a longitudinally extending backing member;
a longitudinally extending blade holder along side the backing member and integral therewith;
said blade holder being connected to the backing member by an integral looped resilient connector extending longitudinally and integral with the backing member and the blade holder, with one end of the looped connector being connected to a point of the backing member and the other end of the looped connector being connected to a point of the blade holder.

9. The device of claim 8 wherein the blade holder and the backing member are each a long bowed leaf spring.

References Cited by the Examiner
UNITED STATES PATENTS

| | | | |
|---|---|---|---|
| 2,838,782 | 6/58 | Wallis | 15—250.35 |
| 3,003,175 | 10/61 | Krohm | 15—250.42 |
| 3,041,653 | 7/62 | Krohm | 15—250.42 |
| 3,041,654 | 7/62 | Anderson | 15—250.42 |
| 3,104,412 | 9/63 | Hinder | 15—250.42 |

FOREIGN PATENTS 1,090,122   9/60   Germany.

CHARLES A. WILLMUTH, *Primary Examiner.*